United States Patent Office 3,456,566
Patented July 22, 1969

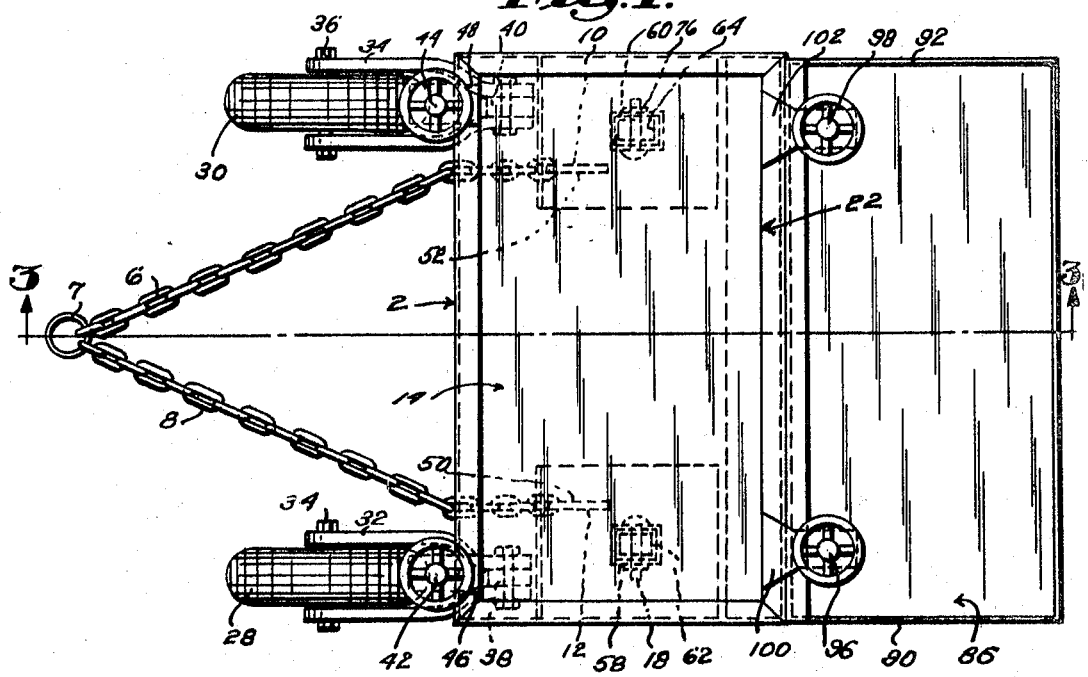

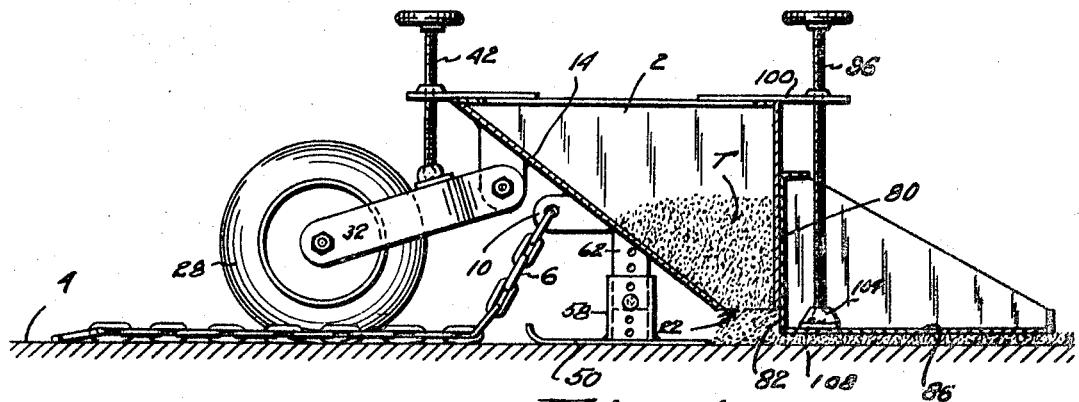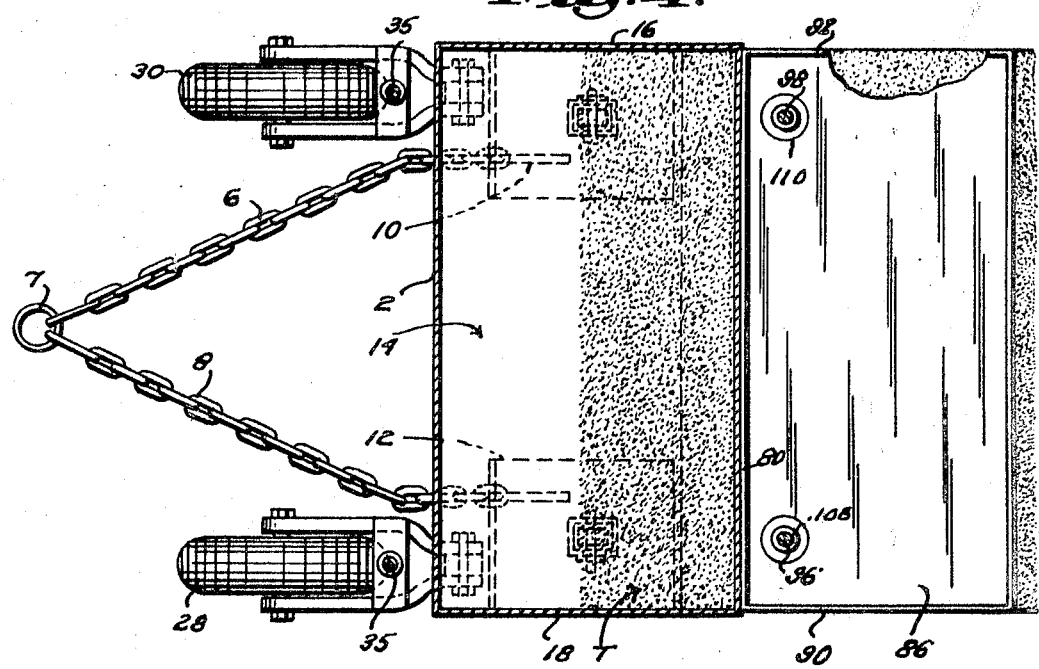

3,456,566
APPARATUS FOR APPLYING ASPHALT TO
FORM A PAVED SURFACE
Bernard J. Lazaro, 31 Lunda St.,
Waltham, Mass. 02154
Filed May 26, 1967, Ser. No. 641,608
Int. Cl. E01c 19/22
U.S. Cl. 94—44    5 Claims

ABSTRACT OF THE DISCLOSURE

A hopper for containing asphalt is supported on vertically adjustable front wheels and intermediately disposed skids in a position to discharge a mass of asphalt through a bottom aperture onto a surface to be covered. At the rear of the hopper is a vertically adjustable grader assembly which extends below the bottom aperture of the hopper to provide a "cut-off" or former edge which continuously forms the discharged mass of asphalt into a layer of predetermined width and thickness.

---

The present invention is concerned with an improved method and apparatus for continuously applying a layer of asphalt or other similar material over a desired surface and, more particularly the invention relates to a method and means for applying asphalt or similar material in a form suitable for comprising a sidewalk paving.

It is now customary in laying asphalt or "hot top" sidewalks to bring a truck load of the hot top to a desired location and then transport small quantities of the hot top from the truck by means of a wheelbarrow or similar vehicle to the particular area to be surfaced. After the hot top material is dumped from the wheelbarrow, it is required to be raked over and levelled and thereafter rolled to form a desired level surface of required thickness and width. This manner of application and forming is time consuming and tends to result in inaccuracies and the finished product may be in some cases, lacking in professional appearance.

It is therefore an object of the present invention to provide an improved method and means for laying the hot top in the form of a sidewalk or similar access area.

Another object is to provide a method and apparatus for continuously discharging a mass of hot top and simultaneously forming and grading a predetermined thickness of the hot top from the discharged mass to form a sidewalk with a minimum of labor and time.

Another object is to provide a combination hopper and grading apparatus which can be utilized in areas of relatively limited space and which can be conveniently adjusted to vary the thickness of the sidewalk formed.

With the above-noted objects and considerations in mind, I have conceived of an improved method and apparatus for laying hot top, particularly in the form of a sidewalk. My improved method is based on the idea of drawing a loaded hopper of hot top along a desired surface to be covered by means of a tractor or other powered vehicle. While the hopper is moving, hot top is continuously released from the bottom thereof in the form of a continuously advancing bank of the material which is pushed ahead and cut-off in a desired thickness by means of an adjustable former and grading apparatus.

The hopper is constructed with a special inclined discharging surface which extends rearwardly and terminates at the bottom of the hopper to define an elongated discharge gate or aperture. The spacing of the aperture or gate above the work surface may, I find, be varied to provide for forming an advancing bank of hot top just ahead of the aperture. This advancing bank of hot top may also be desirably controlled by means of a rearwardly disposed former surface and grader means to constantly apply a layer of desired thickness which is graded and compressed into a solid mass.

The general construction and operation of the method and apparatus together with its novel features will be more fully understood and appreciated from the following description of a preferred embodiment shown in the accompanying drawings, in which:

FIGURE 1 is a plan view of the apparatus of the invention;
FIGURE 2 is a side elevational view of the apparatus;
FIGURE 3 is a cross section taken on the line 3—3 of FIGURE 1;
FIGURE 4 is a plan cross section taken on the line 4—4 of FIGURE 2; and
FIGURE 5 is a detail cross section taken on the line 5—5 of FIGURE 2.

The principal parts of the apparatus of the invention include a hopper, wheels and skids for adjustably supporting the hopper in a position to be drawn by a power vehicle, and a former and grader unit which is vertically suspended from a rear section of the hopper in suitably spaced relation to a surface to be covered with a layer of hot top or the like.

Referring more in detail to the structure shown in the drawings, numeral 2 denotes the hopper member which is designed to be drawn by a tractor or other powered vehicle (not shown) along a surface 4 which may, for example, be a sidewalk area to be covered.

The hopper 2 is provided with attached chain sections as 6 and 8 which engage in a ring 10 in turn adapted to be secured to the tractor referred to above. At their ends the rear of the chain sections 6 and 8 are attached to brackets as 10 and 12 which are located well below the top of the hopper in approximately a centered relationship.

The hopper is constructed with a front section 14 which comprises an inclined discharge surface extending rearwardly as shown in FIGURE 3. This angled side 14, together with vertically disposed sides 16 and 18 and a rear section 20 are joined together in some convenient way as by welding to meet and form an elongated aperture 22 which constitutes a discharge gate. The elongated aperture extends all the way across the hopper bottom and is designed to be supported in spaced relation to the work surface 4 to provide for discharge of a mass of hot top T contained in the hopper.

The hopper construction described is further provided with novel supporting means including a pair of wheels 28 and 30 which are rotatably mounted in forwardly extending bearing arms 32 and 34 on pins as 34 and 36. The bearing arms 32 and 34 are preferably U-shaped as shown in FIGURE 1 and pivotally attached to hangers 38 and 40 solidly secured to the hopper section 14.

Pivotally attached to the bearing arms 32 and 34 by ball joints 33 and 35 at intermediate points thereon are vertical adjustment screws 42 and 44 which are threaded into respective brackets 46 and 48 solidly anchored to upper edge portions of the hopper 2 as best shown in FIGURE 2. By turning the screws 42 and 44 the front edges of the hopper may be raised or lowered into varying positions of vertical adjustment.

Arranged to cooperate with the wheels 28 and 30 in supporting the hopper 2 are further provided a pair of supporting slides or shoes 50 and 52 which consist of strips of steel or other suitable material having curved front ends 54 and 56. Each of the shoes 50 and 52 have vertically mounted thereon tubular members 58 and 60 in which are telescopically received tubular adjustments 62 and 64. The tubular members 58 and 60, as well as the parts 62 and 64, are formed with pin slots as 68, 70, 72, etc., which are arranged to register in raised portions of vertical adjustment and to receive therethrough locking pins as 74 and 76.

It will be observed that by raising and lowering the front end of hopper 2 by adjustment screws 42 and 44, it becomes possible to vary the angle of inclination of the inclined section 14 and also to increase or decrease the spacing of the discharge aperture 22 in a desirable manner to provide for very close control of the rate and amount of hot top released.

It will also be observed that for each setting of the adjustment screws the shoes 50 and 52 may be adjusted through respective telescoping tubular parts described to assume a load-bearing function and carry rearwardly disposed weight of the hopper apparatus at the adjusted height and angularity chosen.

At the rear section 20 of the hopper is suspended a special former and grader unit which is constructed of a relatively heavy gauge metal such as steel. This former and grader unit includes a vertically disposed former portion and a horizontally disposed grader portion. The former portion is indicated at 80 and consists in one preferred form of an adjustable plate section slidably supported against the rear section 20 of the hopper 2. The former is arranged to provide a downwardly projecting former surface 82 which extends below the elongated aperture 22 an appreciable distance and in spaced relation to the surface 4 best shown in FIGURES 2 and 3.

The grader portion is denoted by numeral 86 and is solidly secured to former portion 80 along the bottom edge thereof in a right angularly disposed position and extends rearwardly for an appreciable distance in a substanially horizontally disposed plane as shown in FIGURES 2 and 3. Two opposite vertical edges of the former portion 80 have welded or otherwise secured thereto side portions 90 and 92. These side portions 90 and 92 are also secured as by welding or the like to opposite edges of the member 86 to thus form a rigidly braced grader construction whose bottom surface is designed to slidably engage over and grade a thickness or layer of hot top discharged from the aperture 22 and formed by the forming surface 82.

The former and grader unit thus constructed may be adjustably secured in any desired vertical spacing with respect to the surface 4 by means of a pair of adjusting screws 96 and 98. The adjusting screws are in threaded engagement with respective holding brackets 100 and 102, best shown in FIGURE 1, which project rearwardly from the back edge of the hopper as indicated. At the bottoms of the screws 96 and 98 are provided socket members as 104, 106 in which are contained ball joint extremities 108 and 110.

In operation the hopper apparatus is located at one end of a sidewall area to be covered and the chain sections 6 and 8 through ring portions which are attached to a tractor or other vehicle which is to be moved at a predetermined rate of travel. For the rate of travel chosen, the front end of the hopper is adjusted by turning the screws 42 and 44 to raise or lower the wheels 28 and 30 into desired position to provide for a required bank of hot top material being discharged from the hopper apertures. Similarly, the tubular members 58 and 62 are adjusted and secured by means of the locking pin 74.

The hopper is then supplied with a quantity of hot top which is replenished from time to time as the apparatus is drawn along the sidewalk surface area. Also, the former and grader unit is vertically adjusted on the hopper in accordance with the rate of travel described in order to provide a desired paving thickness.

These adjustments on the hopper and grader unit provide for the hot top sliding down the inclined surface of side 14 and being discharged through apertures 22 to provide a bank of hot top which is continuiusly engaged by the former surface 82 of former 80. The bank of hot top is continuously advanced in a height appreciably greater than the desired finished layer. This continuously formed and advanced bank of hot top is engaged by the bottom edge of former surface 82 to provide a metering action such that a required thickness of layer is cut-off and allowed to pass under the grading portion 86. Simultaneously the bottom surface of this grading portion 86 levels and compresses the hot top passing thereunder and thus provides a finished grading.

It is pointed out that the continuous application of paving thus accomplished is variable by regulating the angularity of hopper side 14 as well as the height of the aperture 22 and the height of the former and grader unit, having regard for the rate of speed of travel of the hopper along the surface. There is thus afforded an efficient and time saving method of laying a pavement in a range of thicknesses.

While I have shown preferred materials and means, it should be understood that changes and modifications may be practiced in keeping with the scope of the appended claims.

I claim:

1. Apparatus for applying asphalt and the like to a surface to form a paving, said apparatus comprising a hopper member for containing a quantity of asphalt, said hopper being formed with a bottom discharge aperture and a rearwardly extending inclined surface terminating at the aperture, forwardly disposed wheels, means for pivotally supporting the front of the hopper in vertically adjustable relationship on the wheels, vertically adjustable shoe means attached between the front of the hopper and the discharge aperture and cooperating with the forwardly disposed wheels to slidably support an underside of the hopper, a former element suspended from the rear of the hopper in vertically adjustable relationship for engaging and forming a layer of asphalt expelled through the discharge aperture, and a grader element extending rearwardly from the former element for compacting and grading the said layer of asphalt.

2. An apparatus according to claim 1 in which the former element includes a vertical former edge which extends downwardly from the hopper aperture in spaced relation to the said surface, and the said grader element extends rearwardly in the plane of the bottom edge of the former element, and said shoes being adjusted in relation to the vertical adjustment of the front of the hopper to locate the discharge aperture, former element and grading element in substantially parallel predetermined spaced relationship to the said surface to be paved.

3. An apparatus according to claim 2 in which the hopper includes a supporting bracket fixed at a rear top side thereof and a vertical adjustment screw received in the bracket and having its bottom end attached to the said grader element for raising and lowering same.

4. A structure according to claim 1 in which the means for pivotally suporting the front of the hopper includes hopper extension parts, and vertical screw means between said hopper extension parts and said wheels for varying the position of the hopper front relative to the wheels.

5. Apparatus for applying asphalt and the like to a surface to form a paving, said apparatus including a hopper member movable along the said surface and being open at its top side to receive and contain a quantity of asphalt, said hopper being formed with a rearwardly inclined bottom section, a vertical rear wall section, and opposite side walls extending between the rear wall section and the inclined bottom section; said inclined bottom section and said rear wall section having lower edges arranged in spaced apart relation to define a transverse bottom discharge aperture through which a bank of asphalt may be continuously expelled from the hopper when being moved along the said surface, a pair of forwardly disposed wheels, means for pivotally supporting the front of the hopper in vertically adjustable relationship on the wheels, slide means arranged between the wheels and the said discharge aperture for slidably supporting an intermediate portion of the hopper, said slide means comprising a pair of shoes secured to the inclined bottom section of the hopper and having vertical adjustment means for locating and adjusting the elevation of said discharge aperture above the said surface to be paved in accordance with the vertical adjustment of the front of the hopper on said wheels thereby to regulate the thickness of the bank of asphalt discharged through the aperture, a former element suspended from the rear wall section of the hopper in vertically adjustable relationship, said former projecting downwardly below the said discharge aperture to constitute a doctor edge for engaging with the said bank of asphalt as it is expelled from the hopper and for forming a layer of asphalt of predetermined thickness during forward travel of the hopper, and a grader element extending rearwardly in the plane of the bottom edge of the former and being held by said slide shoes in substantially parallel relationship above the surface to be paved for compacting and grading the layer of asphalt formed by the doctor edge.

References Cited

UNITED STATES PATENTS

| | | | |
|---|---|---|---|
| 1,470,157 | 10/1923 | Fike | 94—46 |
| 1,940,898 | 12/1933 | Arndt | 94—44 |
| 2,403,820 | 9/1946 | Miller | 94—44 |
| 2,590,443 | 3/1952 | Miller | 94—44 |
| 2,950,660 | 8/1960 | Standfuss | 94—44 XR |
| 3,088,383 | 5/1963 | Ekstrom | 94—46 |
| 3,108,517 | 10/1963 | Fingland | 94—44 |

JACOB L. NACKENOFF, Primary Examiner